United States Patent
Ammons et al.

(10) Patent No.: US 9,218,139 B2
(45) Date of Patent: Dec. 22, 2015

(54) MINIMALLY DISRUPTIVE VIRTUAL MACHINE SNAPSHOTS

(71) Applicant: International Business Machines Corporation, Armonk, NY (US)

(72) Inventors: Glenn S. Ammons, West Chester, PA (US); Vasanth Bala, Rye, NY (US); Canturk Isci, Secaucus, NJ (US); Sastry S. Duri, Yorktown Heights, NY (US); Todd W. Mummert, Danbury, CT (US); Giovanni Pacifici, New York, NY (US); Darrell C. Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/968,722

(22) Filed: Aug. 16, 2013

(65) Prior Publication Data

US 2015/0052321 A1  Feb. 19, 2015

(51) Int. Cl.
  *G06F 12/00*  (2006.01)
  *G06F 3/06*  (2006.01)
  *G06F 11/14*  (2006.01)
  *G06F 17/30*  (2006.01)

(52) U.S. Cl.
  CPC ............ *G06F 3/065* (2013.01); *G06F 3/067* (2013.01); *G06F 3/0619* (2013.01); *G06F 11/1451* (2013.01); *G06F 17/30088* (2013.01); *G06F 2201/84* (2013.01)

(58) Field of Classification Search
  CPC ....... G06F 3/065; G06F 3/067; G06F 3/0619; G06F 11/1451; G06F 17/30088; G06F 2201/84

See application file for complete search history.

(56) References Cited

U.S. PATENT DOCUMENTS

| | | |
|---|---|---|
| 6,848,106 B1 | 1/2005 | Hipp |
| 7,277,999 B1 | 10/2007 | Agesen et al. |
| 8,621,233 B1 | 12/2013 | Manadhata et al. |
| 8,806,625 B1 | 8/2014 | Berger |
| 2003/0158834 A1 | 8/2003 | Sawdon et al. |
| 2003/0208463 A1 | 11/2003 | Vishlitzky et al. |

(Continued)

FOREIGN PATENT DOCUMENTS

| | | |
|---|---|---|
| WO | 2010144757 A1 | 12/2010 |
| WO | 2011051025 A1 | 5/2011 |

(Continued)

OTHER PUBLICATIONS

Gene H. Kim, Eugene H. Spafford. "Experiences with Tripwire: Using Integrity Checkers for Intrusion Detection". Purdue Technical Report CSD-TR-94-012. Purdue University Libraries , Feb. 21, 1994: 13 pages, plus two cover pages.

(Continued)

*Primary Examiner* — John Lane
(74) *Attorney, Agent, or Firm* — William Stock; Hoffman Warnick LLC

(57) ABSTRACT

Aspects of the present invention provide a solution for creating a snapshot of a virtual server. In an embodiment, a first write storage is created in response to a snapshot request. For each write from the virtual server to primary storage that is the first write of that particular data block since the snapshot request, the data that resided in the data block previous to the write is copied from the primary storage to the first write storage.

25 Claims, 7 Drawing Sheets

(56) References Cited

U.S. PATENT DOCUMENTS

| | | |
|---|---|---|
| 2004/0044996 A1 | 3/2004 | Atallah |
| 2006/0225065 A1 | 10/2006 | Chandhok et al. |
| 2007/0043896 A1 | 2/2007 | Daruwala et al. |
| 2007/0055710 A1 | 3/2007 | Malkin |
| 2007/0150677 A1* | 6/2007 | Homma et al. ............... 711/162 |
| 2008/0028034 A1 | 1/2008 | Currid et al. |
| 2008/0065597 A1 | 3/2008 | Vedula |
| 2008/0104217 A1 | 5/2008 | Srinivasa et al. |
| 2008/0134177 A1 | 6/2008 | Fitzgerald et al. |
| 2008/0263658 A1 | 10/2008 | Michael et al. |
| 2009/0094428 A1* | 4/2009 | Nagata et al. ............... 711/162 |
| 2009/0254990 A1 | 10/2009 | McGee |
| 2009/0319580 A1 | 12/2009 | Lorenz et al. |
| 2010/0030983 A1 | 2/2010 | Gupta et al. |
| 2010/0070725 A1 | 3/2010 | Prahlad et al. |
| 2010/0107158 A1 | 4/2010 | Chen et al. |
| 2011/0131183 A1 | 6/2011 | Chandhok et al. |
| 2011/0161299 A1 | 6/2011 | Prahlad et al. |
| 2012/0323853 A1 | 12/2012 | Fries et al. |
| 2013/0111018 A1 | 5/2013 | Ammons et al. |
| 2014/0165198 A1 | 6/2014 | Altman |
| 2014/0337594 A1* | 11/2014 | Wade et al. ................... 711/162 |
| 2015/0032699 A1* | 1/2015 | Fujita et al. .................. 707/649 |

FOREIGN PATENT DOCUMENTS

| | | |
|---|---|---|
| WO | 2012132815 A1 | 10/2012 |
| WO | 2012173831 A2 | 12/2012 |

OTHER PUBLICATIONS

Author unknown. "Osiris User Handbook". Archived Feb. 18, 2010. 17 pages Published by the Shmoo Group. Available online: http://web.archive.org/web/2010021811548/http://osiris.shmoo.com/handbook.html.

U.S. Appl. No. 13/527,948, Office Action dated Dec. 31, 2014, 36 pages.

U.S. Appl. No. 13/527,994, Office Action dated May 7, 2015, 46 pgs.

Application No. GB1402601.7, Examination Report Response, Apr. 24, 2014, 15 pages.

Richardson, Application No. GB1218642.5, Combined Search and Examination Report under Sections 17 and 18 (3), Mar. 3, 2013, 6 pages.

Garfinkel et al., "A Virtual Machine Introspection Based Architecture for Intrusion Detection", NDSS 2003, 16 pages.

H. Pomeranz, "Mounting Images Using Alternate Superblocks", http://computer-forensics.sans.org/, Dec. 2008, 4 pages.

Nance et al., "Investigating the Implications of Virtual Machine Introspection for Digital Forensics", IEEE, 2009, 978-0-7695-3564-7/09, pp. 1024-1029.

Fu et al., "Space Traveling across VM: Automatically Bridging the Semantic Gap in Virtual Machine Introspection via Online Kernel Data Redirection", 2012 IEEE Symposium on Security and Privacy, pp. 586-600.

Jiang et al., "Stealthy Malware Detection and Monitoring through VMM-Based "Out-of-the-Box" Semantic View Reconstruction", ACM Transactions on Information and System Security, vol. 13,No. 2, Article 12, Publication date: Feb. 2010, 28 pages.

Srinivasan et al., "Process Out-Grafting: An Efficient "Out-of-VM" Approach for Fine-Grained Process Execution Monitoring", Workshop for Frontiers of Cloud Computing, Dec. 1, 2011, 41 pages.

VM Ware, "Server Consolidation using IBM BladeCenter and VMare Infrastructure", 2005, 12 pages.

Kotsovinos et al., "Virtualization: Blessing or Curse?", ACM Que, vol. 8, No. 11, 2010, 3 pages.

Reimer et al., "Opening Black Boxes: Using Semantic Information to Combat Virtual Machine Image Sprawl", VEE '08, Mar. 5-7, 2008, ACM 978-1-59593-796-4/08/03, pp. 111-120.

"Libguestfs, tools for accessing and modifying virtual machine disk images", http://libguestsfs.org/, 5/21/213, 2 pages.

Mauelshagen et al., "The Linux Logical Volume Manager", Red Hat Magazine, Issue #9, Jul. 2005, 13 pages.

Paranjape, "Right to Your own Devices", Linux Gazzette #114, May 2005, 9 pages.

Gilly et al., "Recent Developments in Patent Enforcement in the Cloud," Nov. 2011, pp. 1-6, BNA's Patent, Trademark & Copyright Journal.

Richardson, Application No. GB1218642.5, Examination Report dated Oct. 15, 2013, 3 pages.

U.S. Appl. No. 13/920,288, Office Action 1 dated Jul. 17, 2015, (IBMY-0077), 43 pgs.

U.S. Appl. No. 13/527,948, Final Office Action 1 dated Aug. 31, 2015, (IBMY-0067), 36 pgs.

U.S. Appl. No. 13/527,994, Notice of Allowance dated Aug. 25, 2015, (IBMY-0066), 20 pgs.

* cited by examiner

Figure 6

| Virtual Block | 22 | 85 | 30 | 16 | 53 | 25 |
|---|---|---|---|---|---|---|
| Target Block | 75 | 27 | 81 | 46 | 34 | 39 |
| First Write | Yes | No | No | No | Yes | No |

MINIMALLY DISRUPTIVE VIRTUAL MACHINE SNAPSHOTS

TECHNICAL FIELD

The subject matter of this invention relates generally to computer systems management. More specifically, aspects of the present invention provide a solution for improved creation of a machine snapshot in a complex virtual environment.

BACKGROUND

In the electronic environment of today, computer systems undergo constant changes. In order to keep up with these changes, it is important that users of these systems be able to monitor the systems. Monitoring can be classified into several different types, including active monitoring and passive monitoring. Passive monitoring includes any observation that does not modify a computer system. To this extent, passive monitoring can include scanning a file system to perform a compliance check, scanning a registry to determine which applications are currently installed on the system, security scanning, file system inspection, license usage monitoring, and the like. In contrast, activities, such as patching, applying a security update, etc., that involve modification of the computer system are referred to as active monitoring.

In a standard single-kernel computer system, passive monitoring often includes running one or more programs in the background of the system to perform passive monitoring functions. However, this solution becomes less practical in computer systems, such as virtual server type computer systems, in which a large number of instances are executed on the same physical machine. For example, a snapshot creator program, while consuming relatively little space and/or resources when run once on a single kernel system, consumes increasingly larger amounts of space and/or resources when an instances of it is included and running in every virtual server instance in a virtual machine.

One way of performing passive monitoring of a computer system that minimizes the limitations mentioned above utilizes a system "snapshot." Such a "snapshot" can capture data corresponding to the file system, the running state and/or any other information in software stack of a particular system, virtual or otherwise, at a particular point in time. This "snapshot" can then be evaluated by passive monitoring software without affecting the execution of the system itself.

SUMMARY

In general, aspects of the present invention provide a solution for creating a snapshot of a virtual server. In an embodiment, a first write storage is created in response to a snapshot request. For each write from the virtual server to primary storage that is the first write of that particular data block since the snapshot request, the data that resided in the data block previous to the write is copied from the primary storage to the first write storage. This first write storage mechanism exists to provide a consistent, point-in-time view of the initial system. The initial system is allowed to continue to change; however, the original data block is preserved in the first write storage.

A first aspect of the invention provides a method for creating a snapshot of a virtual server, comprising: creating, in response a snapshot request, a first write storage; copying, for every instance that a write to a data block in a primary storage is a first write to the data block subsequent to the snapshot request, data from the data block previous to the write from the primary storage to the first write storage; compiling the snapshot from a combination of copied data blocks in the first write storage and data blocks in the primary storage that have not been written subsequent to the snapshot request.

A second aspect of the invention provides a system for creating a snapshot of a virtual server, comprising at least one computer device that performs a method, comprising: creating, in response a snapshot request, a first write storage; copying, for every instance that a write to a data block in a primary storage is a first write to the data block subsequent to the snapshot request, data from the data block previous to the write from the primary storage to the first write storage; compiling the snapshot from a combination of copied data blocks in the first write storage and data blocks in the primary storage that have not been written subsequent to the snapshot request.

A third aspect of the invention provides a computer program product embodied in a computer readable medium for creating a snapshot of a virtual server, which, when executed, performs a method comprising: creating, in response a snapshot request, a first write storage; copying, for every instance that a write to a data block in a primary storage is a first write to the data block subsequent to the snapshot request, data from the data block previous to the write from the primary storage to the first write storage; compiling the snapshot from a combination of copied data blocks in the first write storage and data blocks in the primary storage that have not been written subsequent to the snapshot request.

A fourth aspect of the present invention provides a method for deploying an application for creating a snapshot of a virtual server, comprising: providing a computer infrastructure being operable to: create, in response a snapshot request, a first write storage; copy, for every instance that a write to a data block in a primary storage is a first write to the data block subsequent to the snapshot request, data from the data block previous to the write from the primary storage to the first write storage; compile the snapshot from a combination of copied data blocks in the first write storage and data blocks in the primary storage that have not been written subsequent to the snapshot request.

Still yet, any of the components of the present invention could be deployed, managed, serviced, etc., by a service provider who offers to implement passive monitoring in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 6 shows an example updated device mapper table according to embodiments of the invention.

Figure 1:
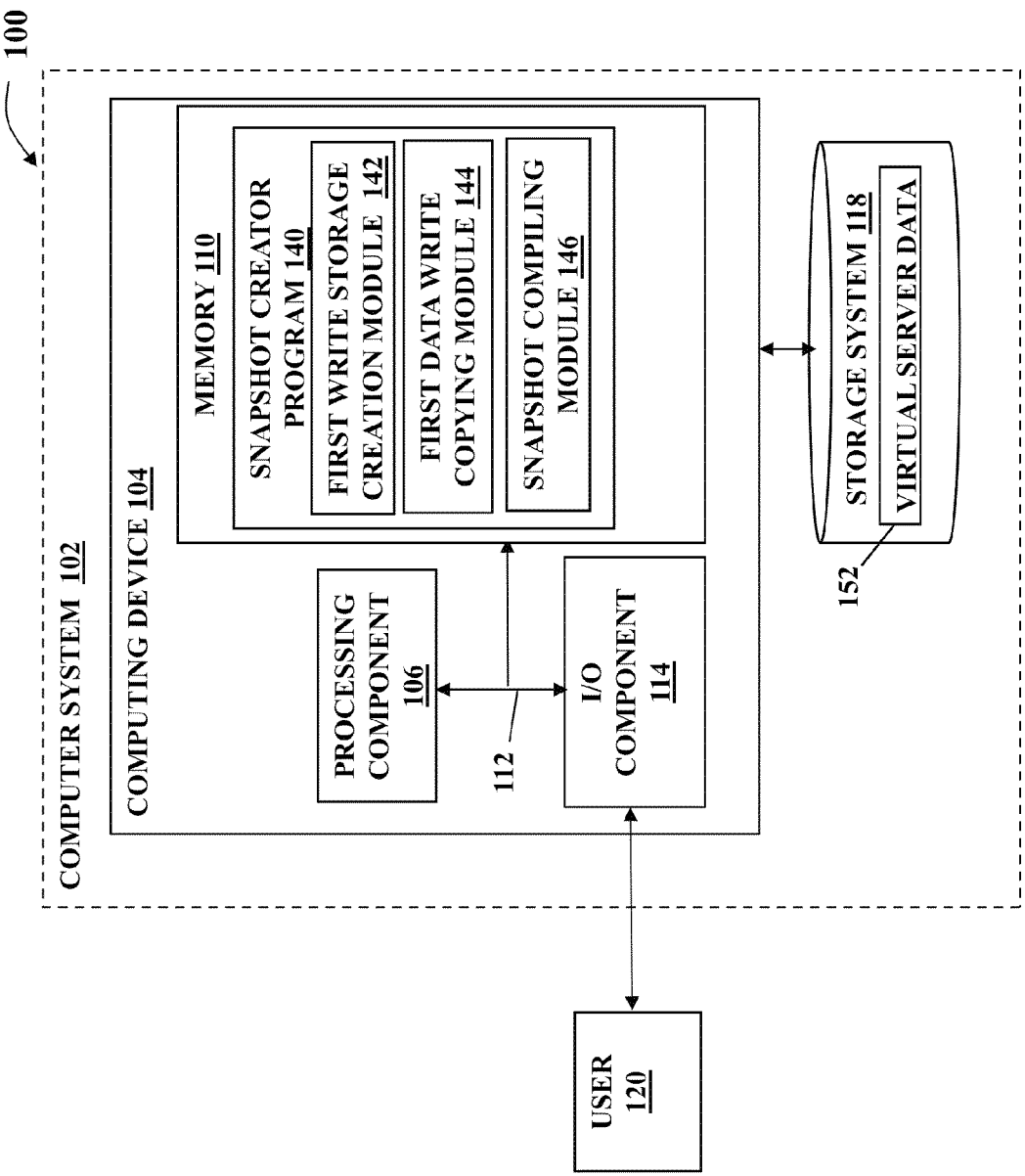
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The current way of creating a snapshot of a virtual server can be improved. Specifically, it has previously not been possible to capture the disk state of a running virtual server instance without significant impact on the execution of the virtual server at the beginning and/or end of the snapshot interval. For example, currently some hypervisors include utilities that support taking of disk snapshots. However, these utilities are not universally applicable. Further, these utilities often have significant impact on the running system. As such, creating a snapshot using these utilities can cost unnecessary time and resources.

As indicated above, aspects of the present invention provide a solution for creating a snapshot of a virtual server. In an embodiment, a first write storage is created in response to a snapshot request. For each write from the virtual server to primary storage that is the first write of that particular data block since the snapshot request, the data that resided in the data block previous to the write is copied from the primary storage to the first write storage. All the subsequent writes to the same block are performed directly on the primary storage, and thus, introduce no additional overhead.

Turning to the drawings, FIG. 1 shows an illustrative environment 100 for creating a snapshot of a virtual server. To this extent, environment 100 includes a computer system 102 that can perform a process described herein in order to create a snapshot of a virtual server. In particular, computer system 102 is shown including a computing device 104 that includes a snapshot creator program 140, which makes computing device 104 operable to create a snapshot of a virtual server by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as snapshot creator program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 106, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, snapshot creator program 140 can manage a set of interfaces (e.g., graphical user interface(s), application program interface, and/or the like) that enable human and/or system users 120 to interact with snapshot creator program 140. Users 120 could include system administrators who want to create one or more snapshots of one or a plurality of virtual servers, among others. Further, snapshot creator program 140 can manage (e.g., store, retrieve, create, manipulate, organize, present, etc.) the data in storage system 118, including, but not limited to virtual server data 152, using any solution.

In any event, computer system 102 can comprise one or more computing devices 104 (e.g., general purpose computing articles of manufacture) capable of executing program code, such as snapshot creator program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, snapshot creator program 140 can be embodied as any combination of system software and/or application software. In any event, the technical effect of computer system 102 is to provide processing instructions to computing device 104 in order to create a snapshot of a virtual server.

Further, snapshot creator program 140 can be implemented using a set of modules 142-146. In this case, a module 142-146 can enable computer system 102 to perform a set of tasks used by snapshot creator program 140, and can be separately developed and/or implemented apart from other portions of snapshot creator program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of snapshot creator program 140 fixed thereon (e.g., one or more modules 142-146). However, it is understood that computer system 102 and snapshot creator program 140 are only representative of various possible equivalent computer systems that may perform a process described herein. To this extent, in other embodiments, the functionality provided by computer system 102 and snapshot creator program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, snapshot creator program 140 enables computer system 102 to create a snapshot of a virtual server. To this extent, snapshot creator program 140 is shown including a first write storage creation module 142, a first data write copying module 144, and a snapshot compiling module 146.

Figure 2:
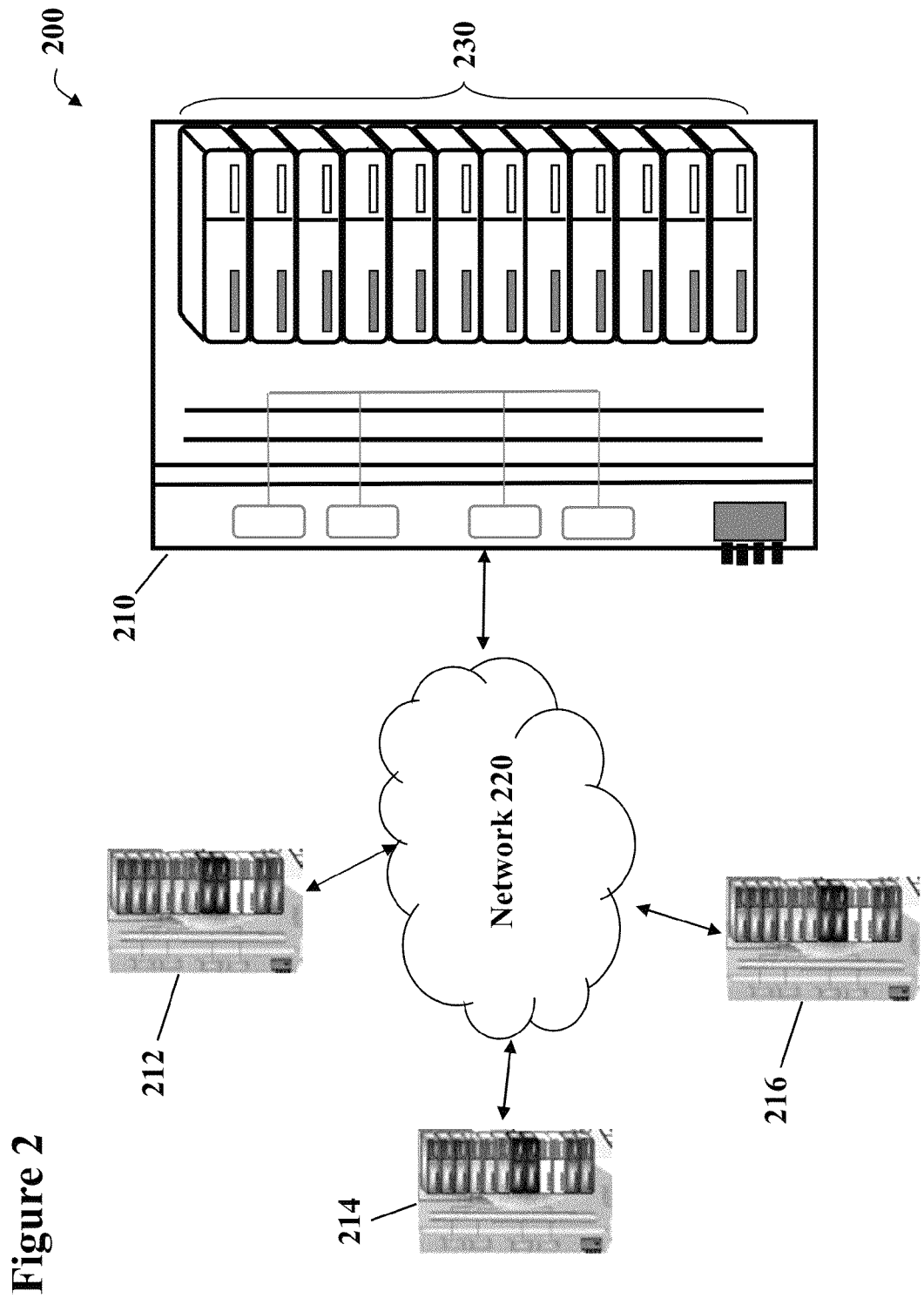
FIG. 2 shows a virtualized datacenter environment according to embodiments of the invention.

Referring now to FIG. 2, a virtualized datacenter environment 200 according to embodiments of the invention is shown. As shown, virtualized datacenter environment 200 has a physical server 210 that can be used to perform all or a portion of the functions of snapshot creator program 140 (FIG. 1). To this extent, physical server 210 can be a server from any manufacturer that runs any platform that is adapted to run multiple instances of a virtual server 230. As illustrated in FIG. 2, virtualized datacenter environment 200 can also contain any number of related physical servers 212, 214, 216. Related physical servers 212, 214, 216 can be connected with physical server 210 for communication purposes via a network 220. Network 220 can allow physical server 210 to communicate with related physical servers 212, 214, 216 and/or physical servers 212, 214, 216 to communicate with one another using any communications solution or solutions now known or later developed. In some embodiments, network 220 can operate on a cloud computing scale, providing, e.g., computation, software, data access, and other services that do not require end-user knowledge of the physical location and configuration of the network 220 that delivers the services.

In any case, as stated above, each instance of virtual server 230 on physical server 210 can operate simultaneously with other systems instances 230 while maintaining independence. This means that each of the instances of virtual server 230 operates independently of other instances of virtual server 230 and does not share information with other instances of virtual server 230 even though the instances of virtual server 230 operate on the same physical server 210. Owing to the characteristics of these instances of virtual server 230, a single physical server 210 can execute a very large number of instances of virtual server 230 concurrently. The independent operation of these instances of virtual server 230 ensures that the number of concurrent instances of virtual server 230 is only limited by the hardware constraints of physical server 210.

Figure 3:
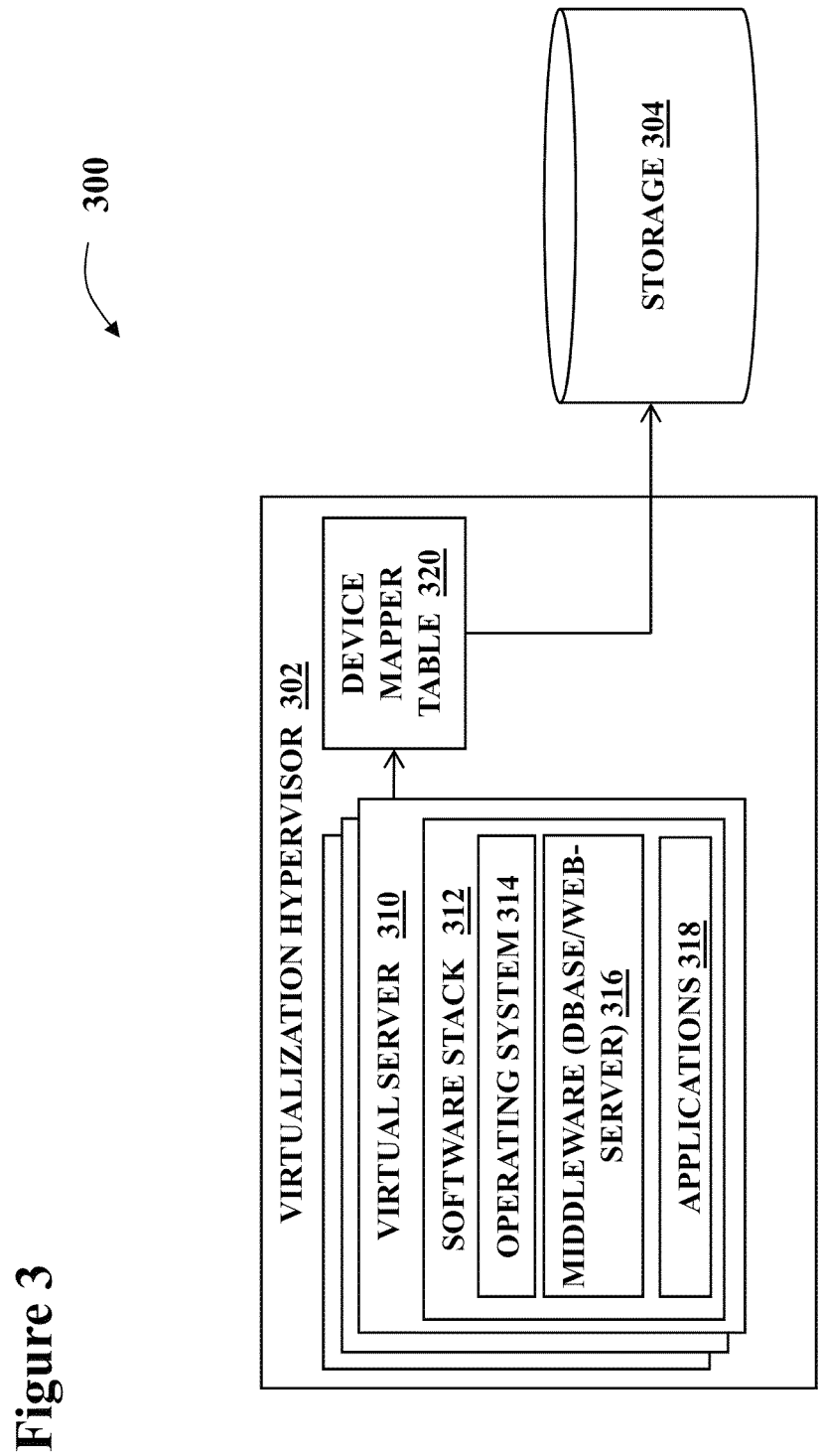
FIG. 3 shows an example virtual server environment according to embodiments of the invention.

Turning now to FIG. 3, an example virtual server environment 300 according to embodiments of the invention is shown. It should be understood that virtual server environment 300 is different from a process virtual machine. A process virtual machine is a platform dependent engine, such as a Java Virtual Machine, that executes platform independent code written in a high-level programming language, such as Java, for performing a specific task (Java and Java Virtual Machine are a trademark of Sun Microsystems in the United States and/or elsewhere). In contrast, the virtual server environment 300 of the current invention is a virtual system that simulates an entire computing environment. To this extent, rather than performing only a single task, the virtual server environment 300 of the current invention is an environment within which a variety of tasks, functions, operations, etc., can be carried out by a user 120 (FIG. 1). As such, virtual server environment 300 can be made to simulate a standalone computer system in the eyes of a user 120 (FIG. 1).

To this extent, virtual server environment 300 includes a virtualization hypervisor 302 at the lowest level. Specifically, virtualization hypervisor 302 provides a platform that allows multiple "guest" virtual server 310 systems to run concurrently on the physical server 210 (FIG. 2). To this extent, virtualization hypervisor 302 provides an abstraction level between the hardware level of physical server 210 (FIG. 2) and the higher level software functions of each virtual server 310. In order to provide these software functions, each virtual server 310 can include a software stack 312, which can also be referred to as an image. Software stack 312 contains everything that is necessary to simulate a "guest" instance of a particular virtual server 310 on physical server 210 via virtualization hypervisor 302. To this extent, software stack 312 can provide an operating system 314, middleware 316, and one or more applications 318.

In order to decrease maintenance costs by limiting the number of different variations of systems running in virtualized datacenter environment 200, standardization can be employed at this level. For example, a specific software stack 312 can be generated from one of a limited number of pre-configured stacks. These pre-configured stacks can be optimized for their particular function by providers of virtualized datacenter environment 200 (FIG. 2). As such, if a user 120 (FIG. 1) wants to utilize database functionality, one or more virtual servers 310 having the same software stack 312 based on the same preconfigured stack can be generated specifically for this user 120. These software stacks 312 could, for example, contain an operating system 314 of a type that is appropriate for performing database functions, middleware 316 that contains a database management system, and applications 318 that are configured to run against the database management system. Similarly, if a user 120 (FIG. 1) wants to utilize web server functionality, one or more virtual servers 310 having the same software stack 312 based on a different preconfigured stack from the preconfigured stack used for the database management system can be generated specifically for that user 120. These software stacks 312 could, for example, contain operating system 314 of a type that is appropriate for web server functions, middleware 316 that contains a web server management system, and applications 318 that are configured to run against the web server management system. It should be understood that software stacks 312 that are adapted to perform various other functions within virtualized datacenter environment could be generated as well. To this extent, operating system 314 can include any operating system now known or later developed. Further, middleware 316 and applications 318 can include any solutions that can be envisioned for providing the desired functionality for a particular virtual server 310.

In any event, in order to perform the task or tasks that are requested of it, virtual server environment 300 may have to perform one or more writes to a storage location 304, which can be located on the virtualization hypervisor 302 or outside the virtualization hypervisor 302. For example, because virtual server 310 is, in essence, software that is being executed by the underlying physical server 210 (FIG. 2) via virtualization hypervisor 302, any changes to software stack 312, such as via operating system 314, middleware 316 and/or applications 318, may require a write operation that communicates the changes to storage 304. To facilitate this write operation, the virtualization hypervisor 302 can provide a device mapper table 320.

Figure 4:
FIG. 4 shows an example device mapper table according to embodiments of the invention.

Turning now to FIG. 4, a device mapper table 320 according to embodiments of the invention is shown. In an embodiment, device mapper table 320 can be a dedicated device (or driver) and/or can be created within the image file of the virtual server (FIG. 3), such as by wrapping the image file of the virtual server in a linear device mapper block at startup of virtual server 310 (FIG. 3). In any event, device mapper table 320, facilitates write operations between a particular virtual server 310 (FIG. 3) and storage 304 (FIG. 3) on the underlying physical server 210 (FIG. 2). Device mapper table 320 does this by mapping virtual addresses used by the virtual server 310 (FIG. 3) to target addresses utilized by storage 304 (FIG. 3). To facilitate this function, device mapper table 320 can include a virtual block 322 and a target block 324. When the virtual server 310 (FIG. 3) reads from or writes to storage 304 (FIG. 3), virtual server 310 (FIG. 3) can submit a request that includes virtual block 322 (e.g., 22). Device mapper table 320 can use the virtual block 322 to map the request to the correct target block 324 in storage 304 (FIG. 3), in this case block #75. Device mapper table 320 can also include a first write indicator 326. First write indicator 326 indicates whether a write to a particular target block 324 in storage 304 (FIG. 3) has occurred. First write indicator 326 can perform this task using any solution now known or later developed, including, but not limited to a data bit, a toggle, a counter, a set of data values associated with each condition, and/or the like.

Figure 5:
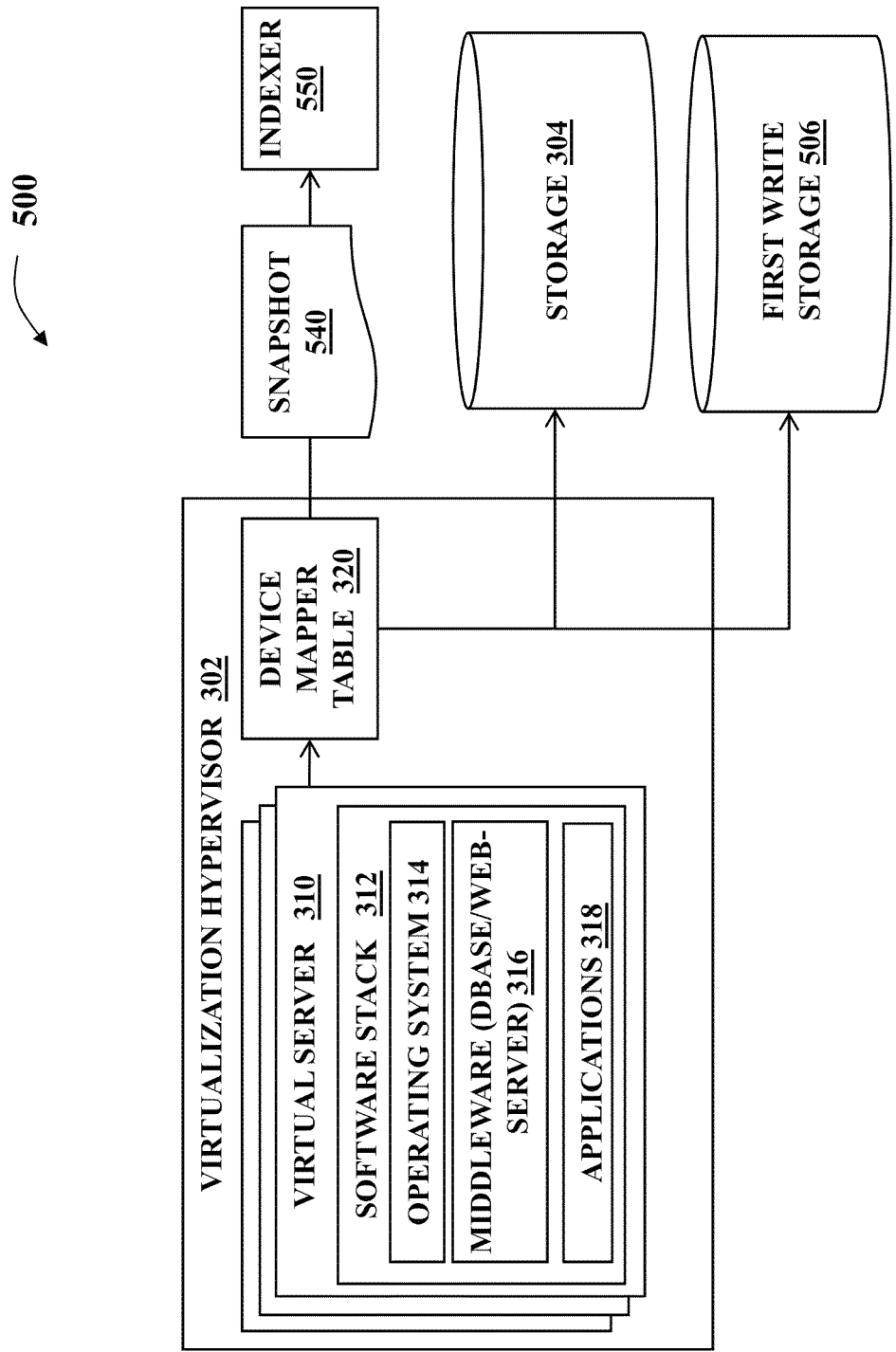
FIG. 5 shows an example updated virtual server environment according to embodiments of the invention.

Turning now to FIG. 5, an updated virtual server environment 500 according to embodiments of the invention is shown. Updated virtual server environment 500 illustrates changes to virtual server environment 300 that has been updated to reflect a snapshot request. A snapshot request can indicate that a user 120 (FIG. 1) desires a snapshot 540 of virtual server that shows the state of virtual server 310 at a particular point in time. To this extent, a request for snapshot 540 can be originated and/or communicated using any solution now known or later developed. In an embodiment, a request for snapshot 540 can be received at an indexer 550 from a central detection server (not shown) that is not co-located with the physical server 210 (FIG. 2) on which virtual server 310 is located.

Returning now to FIG. 1 in conjunction with FIG. 3 and FIG. 5, computer system 102, executing write storage creation module 142 creates a first write storage 506 in response to a request for a snapshot 540. In an embodiment, first write storage 506 can include a block storage device. In any case, first write storage 506 can have the ability to store any and all of the data that is stored in storage 304. In addition, the request for snapshot 540 can precipitate an initializing of first write indicators 326 in device mapping table 320. For example, as shown in FIG. 4, all of first write indicators 326 have been set to "No", indicating that the data blocks have not been written subsequent to the snapshot request.

First data write copying module 144, as executed by computer system 102, copies specific data blocks from storage 304 to first write storage 506. Specifically, one function of first write storage 506 is to insure that the state of the virtual server 310, at the point in time of the request for the snapshot 540, was received. To this extent, each time the virtual server 310 performs a write to storage 304 that would overwrite a block that is part of the state to be preserved, the contents of the block are copied to a corresponding location in first write storage 506 prior to being overwritten. This occurs every time the virtual server performs a write that is the first write to a particular data block since the snapshot 540 request. However, write copying module 144 does not perform a copy operation from storage 304 to first write storage 506 in response to writes to the same data block that are subsequent to the first block because the contents of the data block no longer represent the state of the virtual server 310 at the time of the request for snapshot 540.

In an embodiment, device mapper table 320 can be used to insure that the correct data blocks are copied from storage 304 to first write storage 506. As stated elsewhere, the request for snapshot 540 can cause the first write indicators 326 in device mapper table to be initialized, such as to a state that all of the first write indicators 326 indicate that no first write subsequent to the request has occurred. Subsequently, each time a write request is made by virtual server 310 and device mapper table 320 is accessed to map the virtual block 322 to the corresponding target block 324, a determination can be made as to whether the write is the first write to the target block 324 based on the first write indicator 326 associated with the target block 324.

Based on this determination, a decision can be made as to whether the contents of target block 324 should be copied to a corresponding data block in first write storage 506. For example, if a determination is made that the write to target block 324 is the first write to target block 324, first data write copying module 144 can perform the copying of the pre-write contents of target block 324 to an alternate block in first write storage 506 that is associated with target block 324. Once the contents of target block 324 have been copied to first write storage 506, the write from virtual server 310 to target block 324 can be performed. Further, the first write indicator 326 in device mapper table 320 that is associated with target block 324 can be changed to indicate that a first write to target block 324 has occurred. An example of an updated device mapper table 600 as can be seen in FIG. 6. As illustrated, first write indicators 606 corresponding to target blocks 604 having the values of 75 and 34 have been changed to indicate that writes have been made to these target blocks 604. In contrast, the first write indicators 606 corresponding to all other target blocks remain the same, indicating no writes have been made.

In the alternative, if a determination is made that the write to target block 324 is not the first write to target block, no copying of data from storage 304 to first write storage 506 is necessary or desirable. In this case, the write to target block 324 is performed without copying the pre-write contents from storage 304 to first write storage 506.

Referring now to FIGS. 1, 5 and 6, concurrently, snapshot compiling module 146, as executed by computer system 102, compiles the snapshot 540. This snapshot compiled by snapshot compiling module 146 contains a combination of data from storage 304 and first write storage 506. Specifically, all of the data blocks that were copied to first write storage 506 can be combined with the data blocks in storage 304 that have not been written since the request to form the snapshot 540. In an embodiment, indexer 550 can compile the snapshot based on the first write indicators 606 in updated device mapper table 600. For example, indexer 550 can read the first write indicator 606 for each target block 604 in updated device mapper table 600 in turn to determine whether a write has occurred to the particular target block 604. If the first write indicator 606 associated with a particular target block 604 indicates that a write has occurred to the target block 604 it can be assumed that the contents of the target block 604 at the time of the snapshot request have been copied to first write storage 506 prior to the write. Thus, indexer 550 can retrieve the data block in first write storage 506 corresponding to target block 604 in compiling snapshot 540. In contrast, it can be assumed that the contents of any target block having an associated first write indicator 606 that indicates that a write has not occurred have not changed since the request for snapshot 540. Accordingly, indexer 550 can simply retrieve the contents of these target blocks 604 from storage 304 as indexer 550 compiles snapshot 540. In this way, a snapshot 540 of a virtual server 310 can be retrieved even while the virtual server 310 is executing without significantly affecting performance of the virtual server 540. Further, the use of the updated device mapper table 600 during compilation of the snapshot 540 allow indexer 550 to collect the correct contents of the data blocks without undue searching and/or data misses.

Snapshot 540 can now be used as a point-in-time view of the original system. The snapshot 540 depends on the combined view of the original storage plus the overlay of the first-write storage and analytical or archival operations can be performed upon this view. However, it is also possible to copy the combined view to another location and completely dissociate this snapshot from the original storage view. This copy could then be analyzed in isolation or forwarded to a remote storage or analytics center (not shown).

Figure 7:
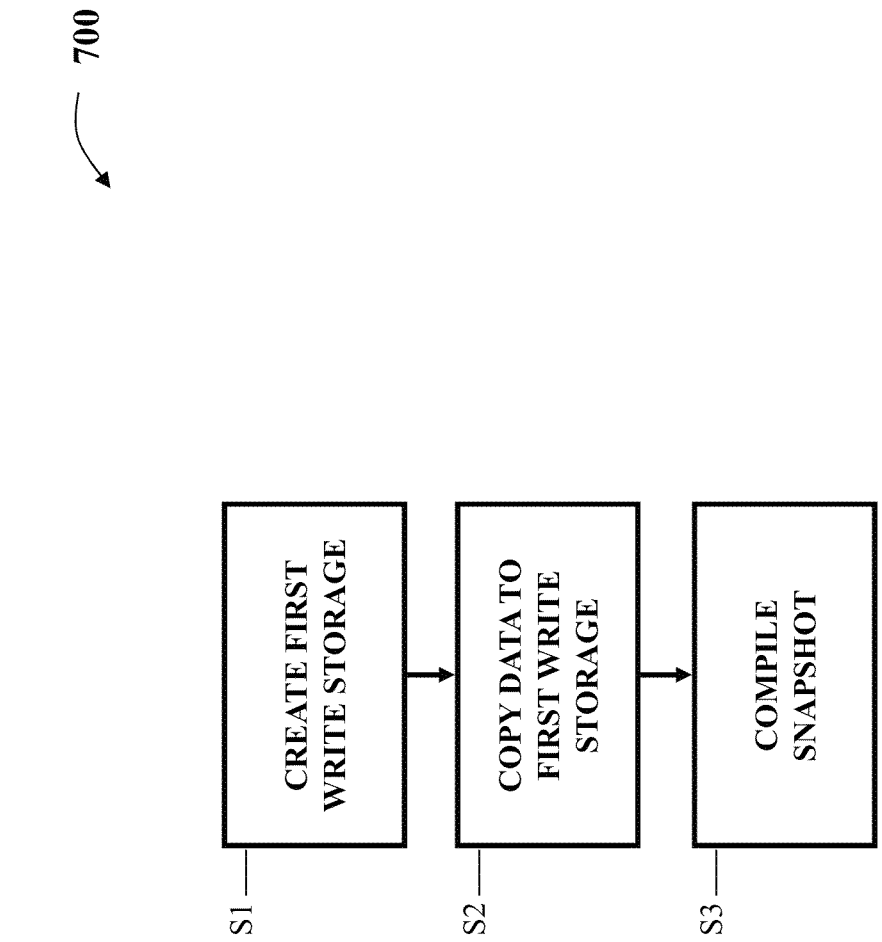
FIG. 7 shows an example flow diagram according to embodiments of the invention.

Turning now to FIG. 7, an example flow diagram according to embodiments of the invention is shown. As illustrated, in 51, first write storage creation module 142 (FIG. 1), as executed by computer system 102 (FIG. 1), creates a first write storage 506 (FIG. 5) in response to a snapshot request. First write indicators 326 (FIGS. 4, 6) in device mapper table 320 (FIGS. 3, 5) can also be initialized in response to the snapshot request. In S2, first data write copying module 144 (FIG. 1), as executed by computer system 102 (FIG. 1), copies data from pre-write data blocks in storage 304 (FIGS. 3, 5) to first write storage 506 (FIG. 5). This copying is performed for every instance that a write to a data block in storage 304 (FIGS. 3, 5) is a first write to the data block subsequent to the snapshot request. In S3, snapshot compiling module 146 (FIG. 1), as executed by computer system 102 (FIG. 1), compiles the snapshot from a combination of the copied data blocks in the first write storage 506 (FIG. 5) and the data blocks in storage 304 (FIGS. 3, 5) that have not been written subsequent to the snapshot request.

While shown and described herein as a method and system for creating a snapshot of a virtual server, it is understood that aspects of the invention further provide various alternative embodiments. For example, in one embodiment, the invention provides a computer program fixed in at least one computer-readable medium, which when executed, enables a computer system to create a snapshot of a virtual server. To this extent, the computer-readable medium includes program code, such as snapshot creator program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as snapshot creator program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for remediating a migration-related failure. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for creating a snapshot of a virtual server, comprising:
    creating, in response to a snapshot request, a first write storage;
    copying, for every instance that a write to a data block in a primary storage is a first write to the data block subsequent to the snapshot request, data from the data block previous to the write from the primary storage to the first write storage;
    compiling the snapshot from a combination of copied data blocks in the first write storage and data blocks in the primary storage that have not been written subsequent to the snapshot request.

2. The method of claim 1, further comprising:
    initializing a set of first write indicators in a device mapper table in response to the snapshot request; and
    determining, in response to each write, whether the write is a first write to a specified data block based on a first write indicator associated with the specified data block.

3. The method of claim 2, further comprising:
    in response to a determination that the write is the first write to the specified data block:

performing the copying of the data from the primary storage to an alternate block associated with the specified block in the first write storage;

performing the write to the specified data block in the primary storage; and changing the first write indicator in device mapper table to indicate that a first write has occurred; and in response to a determination that the write is not the first write to the specified data block, performing the write to the specified data block in the primary storage without copying the data from the primary storage to the first write storage.

4. The method of claim 2, further comprising:
wrapping an image file of the virtual server in a linear device mapper block to create the device mapper table within the image file at a startup of the virtual server.

5. The method of claim 2, wherein the compiling further comprises:
reading, by an indexer, the device mapper table to determine, for each memory block, whether a write has occurred based on the first write indicator associated therewith;

retrieving by the indexer, for each memory block having a first write indicator that indicates that a write has occurred, the memory block from the first write storage; and retrieving by the indexer, for each memory block having a first write indicator that indicates that a write has not occurred, the memory block from the storage.

6. The method of claim 1, wherein the first write storage includes a snapshot block device having copy-on-write properties.

7. The method of claim 1, further comprising, in response to a completion of the compiling of the snapshot, discarding the first write storage.

8. The method of claim 1, further comprising:
receiving the snapshot request from a central detection server and indexer, the request requesting the indexer to perform passive monitoring on the virtual server;

forwarding the compiled snapshot from the indexer to the central detection server; and analyzing the snapshot to perform passive monitoring of the virtual server at the central detection server.

9. A system for creating a snapshot of a virtual server, comprising at least one computer device that performs a method, comprising:
creating, in response to a snapshot request, a first write storage;

copying, for every instance that a write to a data block in a primary storage is a first write to the data block subsequent to the snapshot request, data from the data block previous to the write from the primary storage to the first write storage;

compiling the snapshot from a combination of copied data blocks in the first write storage and data blocks in the primary storage that have not been written subsequent to the snapshot request.

10. The system of claim 9, the method further comprising:
initializing a set of first write indicators in a device mapper table in response to the snapshot request; and determining, in response to each write, whether the write is a first write to a specified data block based on a first write indicator associated with the specified data block.

11. The system of claim 10, the method further comprising:
in response to a determination that the write is the first write to the specified data block:
performing the copying of the data from the primary storage to a alternate block associated with the specified block in the first write storage;

performing the write to the specified data block in the primary storage; and changing the first write indicator in device mapper table to indicate that a first write has occurred; and in response to a determination that the write is not the first write to the specified data block, performing the write to the specified data block in the primary storage without copying the data from the primary storage to the first write storage.

12. The system of claim 10, the method further comprising:
wrapping an image file of the virtual server in a linear device mapper block to create the device mapper table within the image file at a startup of the virtual server.

13. The system of claim 10, wherein the compiling further comprises:
reading, by an indexer, the device mapper table to determine, for each memory block, whether a write has occurred based on the first write indicator associated therewith;

retrieving by the indexer, for each memory block having a first write indicator that indicates that a write has occurred, the memory block from the first write storage; and retrieving by the indexer, for each memory block having a first write indicator that indicates that a write has not occurred, the memory block from the storage.

14. The system of claim 9, wherein the first write storage includes a snapshot block device having copy-on-write properties.

15. The system of claim 9, the method further comprising, in response to a completion of the compiling of the snapshot, discarding the first write storage.

16. The system of claim 9, the method further comprising:
receiving the snapshot request from a central detection server and indexer, the request requesting the indexer to perform passive monitoring on the virtual server;

forwarding the compiled snapshot from the indexer appliance to the central detection server; and analyzing the snapshot to perform passive monitoring of the virtual server at the central detection server.

17. A computer program product embodied in a computer readable non-transitory medium for creating a snapshot of a virtual server, which, when executed, performs a method comprising:
creating, in response to a snapshot request, a first write storage;

copying, for every instance that a write to a data block in a primary storage is a first write to the data block subsequent to the snapshot request, data from the data block previous to the write from the primary storage to the first write storage;

compiling the snapshot from a combination of copied data blocks in the first write storage and data blocks in the primary storage that have not been written subsequent to the snapshot request.

18. The program product of claim 17, the method further comprising:
initializing a set of first write indicators in a device mapper table in response to the snapshot request; and determining, in response to each write, whether the write is a first write to a specified data block based on a first write indicator associated with the specified data block.

19. The program product of claim 18, the method further comprising:

in response to a determination that the write is the first write to the specified data block:
  performing the copying of the data from the primary storage to a alternate block associated with the specified block in the first write storage;
  performing the write to the specified data block in the primary storage; and
  changing the first write indicator in device mapper table to indicate that a first write has occurred; and
in response to a determination that the write is not the first write to the specified data block, performing the write to the specified data block in the primary storage without copying the data from the primary storage to the first write storage.

20. The program product of claim 18, the method further comprising:
  wrapping an image file of the virtual server in a linear device mapper block to create the device mapper table within the image file at a startup of the virtual server.

21. The program product of claim 18, wherein the compiling further comprises:
  reading, by an indexer, the device mapper table to determine, for each memory block, whether a write has occurred based on the first write indicator associated therewith;
  retrieving by the indexer, for each memory block having a first write indicator that indicates that a write has occurred, the memory block from the first write storage; and
  retrieving by the indexer, for each memory block having a first write indicator that indicates that a write has not occurred, the memory block from the storage.

22. The program product of claim 17, wherein the first write storage includes a snapshot block device having copy-on-write properties.

23. The program product of claim 17, the method further comprising, in response to a completion of the compiling of the snapshot, discarding the first write storage.

24. The program product of claim 17, the method further comprising:
  receiving the snapshot request from a central detection server and indexer, the request requesting the indexer to perform passive monitoring on the virtual server;
  forwarding the compiled snapshot from the indexer appliance to the central detection server; and
  analyzing the snapshot to perform passive monitoring of the virtual server at the central detection server.

25. A method for deploying an application for creating a snapshot of a virtual server, comprising:
  providing a computer infrastructure being operable to:
    create, in response to a snapshot request, a first write storage;
    copy, for every instance that a write to a data block in a primary storage is a first write to the data block subsequent to the snapshot request, data from the data block previous to the write from the primary storage to the first write storage; and
    compile the snapshot from a combination of copied data blocks in the first write storage and data blocks in the primary storage that have not been written subsequent to the snapshot request.

* * * * *